United States Patent [19]

Siegert et al.

[11] 4,137,999
[45] Feb. 6, 1979

[54] SELF-LUBRICATING GEAR-TYPE SPINDLE COUPLING

[75] Inventors: Daniel H. Siegert, Pasadena; Steven Banki, Baltimore, both of Md.

[73] Assignee: Koppers Company, Inc., Pittsburgh, Pa.

[21] Appl. No.: 821,347

[22] Filed: Aug. 3, 1977

[51] Int. Cl.² ............................................. F16N 11/04
[52] U.S. Cl. ................................ 184/45 R; 184/15 R
[58] Field of Search ..................... 184/15 R, 15 A, 41, 184/45 R, 45 A; 308/187

[56] References Cited

U.S. PATENT DOCUMENTS

| | | | |
|---|---|---|---|
| 2,403,397 | 7/1946 | Rankin | 184/45 R X |
| 2,593,972 | 4/1952 | Bray | 184/45 R |
| 2,859,598 | 11/1958 | Hochreuter | 184/45 R X |
| 3,135,355 | 6/1964 | Olsen et al. | 184/15 R |
| 3,210,137 | 10/1965 | Williams | 184/45 A X |
| 4,030,178 | 6/1977 | Luebkemann | 184/12 X |

Primary Examiner—David H. Brown
Attorney, Agent, or Firm—Thomas L. Sivak; Oscar B. Brumback

[57] ABSTRACT

A self-lubricating gear-type spindle coupling for use with rotating equipment such as rolling mills, where lubrication is critical. The self-lubricating coupling includes reservoirs connected by first valve means to plenums formed by the retraction of the spring guides in the guide channels when the roll shaft is engaged at roll insertion. A partial vacuum is created in the plenums causing the first valve means to open and the plenums to fill with lubricant from a lubricant reservoir contained in the spindle shaft. When the roll shaft is removed and the compressive force is released from the spring assemblies, the guides move forward in the channels opening second valves which permit the lubricant to pass through the spring housings and onto the sleeves and hubs of the coupling to lubricate the gear teeth.

3 Claims, 1 Drawing Figure

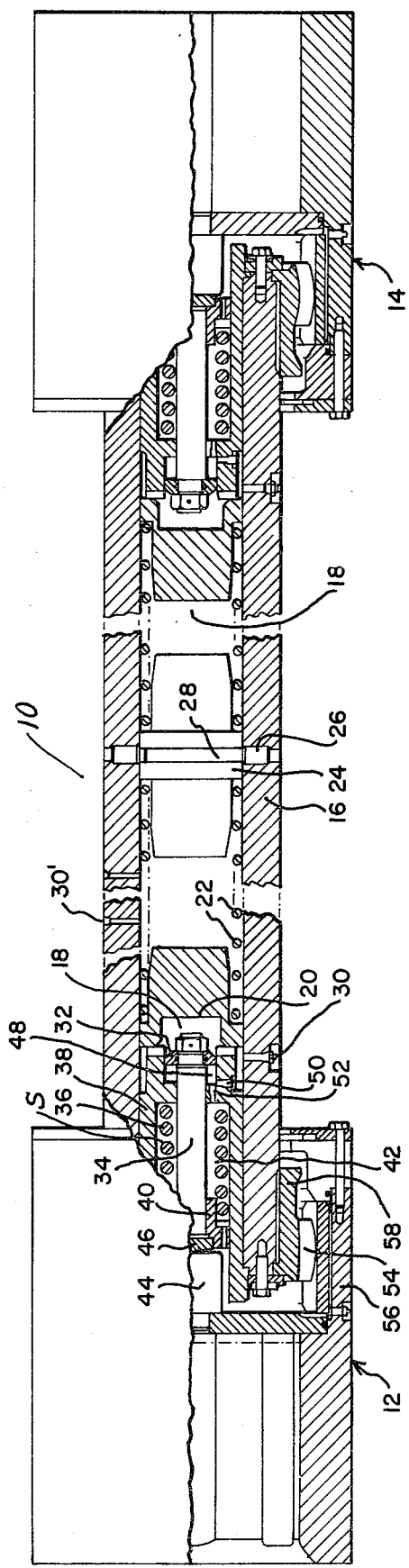

SELF-LUBRICATING GEAR-TYPE SPINDLE COUPLING

BACKGROUND OF THE INVENTION

1. Field of Invention

This invention relates to a self-lubricating coupling and, more particularly, to a self-lubricating coupling for use with rotating equipment such as rolling mills where lubrication is critical but access for manual lubrication is extremely limited.

The use of gear-type spindle couplings is old in the art. The gear-type couplings have been used because of their ability to accommodate the misalignment requirements of rolling mill service coupled with a far longer life than that possible with other coupling forms. However, to use the gear-type coupling to maximum efficiency, it is necessary that the coupling be properly lubricated. If proper lubrication is not maintained, coupling failure usually results with the loss of operating time and the expense of repairing or replacing the coupling.

2. Description of the Prior Art

In some cases, lubrication of the gear-type coupling has heretofore been accomplished manually. While in most instances, manual labor can satisfactorily lubricate the coupling, it has very serious drawbacks. The cost of manual labor to accomplish the task is high. Not only are several laborers required, but at least one of them must possess the requisite skill to supervise the operation to assure it is properly performed. The manual lubrication also causes excessive downtime for the mill which in itself can be extremely costly during periods of peak operation. Also, the lubrication is carried out in limited spaces, under extremely difficult working conditions. Noise and temperatures are necessarily high and the safety of the workmen in the cramped work spaces can be compromised.

The present invention overcomes the foregoing problems of the prior art, by permitting the automatic lubrication of gear-type spindle couplings at the roll and pinion ends, and limiting the need for manual lubrication of the gear teeth.

The invention provides a gear-type spindle coupling adapted to operably engage the roll and pinion end sleeve with internal gear teeth. The spindle shaft of the coupling has a plurality of internal reservoirs, adapted to receive a supply of lubricant through external fittings. The reservoirs are formed so that their rear walls are biased to exert a pressure on the lubricant to urge it toward the roll and pinion ends of the spindle.

The spindle shaft has spring assemblies designed to engage the thrust button on each end to maximize the alignment of the roll end with the spindle of the coupling. The spring assemblies include springs mounted on a shaft between the plunger and slidably mounted cartridge shoulder. When the roll shaft is inserted into the roll sleeve the springs are compressed and move toward the cartridge shoulder in the spring cartridge channel.

A piston is fixably attached to the spring guide rod to move in cooperation with the rod, forward toward the roll end and toward the pinion end of the coupling when the roll shaft is not in operable contact with the spindle and rearward when the roll shaft is in cooperation with the spindle. The back face of the piston together with the spring guide rod and cartridge form the forward wall of the lubricant reservoir.

When the spring assembly is compressed by the roll and pinion ends, a plenum is formed in the spring cartridge channel by the movement of the piston. When the piston is withdrawn from the plenum, the pressure in the plenum is less than that exerted on the lubricant. The pressure differential opens a one-way valve and causes the lubricant to flow into the plenum. Release of the compressive force on the springs causes second spring loaded one-way valves on the roll and pinion end walls of the plenum to open. When the one-way valve opens, lubricant flows from the plenum through the spring assembly between the spindle shaft and the roll and pinion thrust buttons and into the vicinity of the teeth of the sleeves and hubs. Thus, a supply of lubricant is available to lubricate the gear teeth, whenever the roll shaft is removed, during the roll changing operation.

BRIEF DESCRIPTION OF THE DRAWING

FIG. 1 is a side elevational view, partly in section, of the coupling of the present invention.

DESCRIPTION OF THE PREFERRED EMBODIMENT

Referring to the drawing, the gear-type spindle coupling is generally referred to as 10, the roll end of the coupling as 12, and the pinion end as 14.

Spindle coupling 10 includes a shaft 16 having reservoirs 18 for storage of gear lubricant. Reservoirs 18 have rear walls 20 which are biased toward the lubricant by means of springs 22. Springs 22 are fixed to plug 24 which is positioned by set screws 26 fixably mounted in groove 28. Fittings 30 are provided through shaft 16 through which lubricant is provided to the reservoir. Fittings 30' provide pressure relief for the reservoir. Fittings such as 30 and 30' are well known and available in the art. The biasing force exerted by springs 22 is sufficient to urge rear wall 20 towards the ends of the shaft.

Since the structure of the apparatus of the present invention is identical at both the roll and pinion end, the description hereinafter refers generally to the roll end but it will be understood by one skilled in the art that the description is equally applicable to the pinion end, unless a specific exception is set forth.

The front wall of reservoir 18 is formed by piston 32 fixably mounted on the spring guide rod 34. Spring 36 abuts spring guide cartridge 38 and extends over guide rod 34 to guide plunger 40. The spring assembly (S) including piston 32, rod 34, spring 36, and plunger 40 is adapted to slidably fit within spring guide cartridge 38 which is formed by means well known in the art in shaft 16. Plunger 40 includes thrust button 46 which is adapted to engage thrust button 44 of the roll shaft.

When button 44 is inserted further in guide channel 42, a compressive force is exerted causing the spring assembly (S) to be compressed away from the roll end 12. The compression causes the formation of a plenum 48 in the area of cartridge 38 occupied by piston 32. Plenum 48 is connected to reservoir 18 by means of one-way valve 50. Plenum 48 is connected to guide channel 42 by means of one-way valve 52. The structure and operation of valve 50 and valve 52 are well known and understood in the art. The remainder of the flex hub, roll sleeve and attendant structure for connecting the roll shaft to the coupling shaft is conventional and is well known and understood in the art.

In operation, when the roll thrust button 44 is inserted further into channel 42 and the spring assembly (S) is compressed, the pressure in plenum 48 will be less than the pressure exerted on the lubricant in reservoir 18. The imbalance will cause valve 50 to open and permit the flow of lubricant into plenum 48. When the force is removed from thrust button 44, the compressive force on the spring system is removed and piston 32 moved toward plenum 48. The pressure exerted on the lubricant therein causes valve 52 to open and permit the lubricant to flow through channel 42 down to and between the gear teeth 54 of roll sleeve 56 and flex hub 58. Thus, an automatic continuous supply of lubricant is provided every time the roll shaft is removed from the coupling. While the preferred embodiment of the invention has been described, it is understood that the invention may be otherwise embodied within the scope of the following claims.

What is claimed:

1. In a gear-type spindle coupling comprising a shaft, a roll and sleeve on one end of said shaft, a pinion and sleeve on the opposite end of said shaft, resilient means mounted in said opposite ends of said shaft that coact with plunger means which abut thrust plates adapted to be inserted in both of said sleeves, and flex hubs surrounding both ends of said shaft with carrying means drivingly connecting said sleeves to said shaft, the improvement therewith comprising:
    (a) a plurality of first reservoir means in said shaft, said reservoir means adapted to receive a lubricating fluid for lubricating said sleeves and hubs;
    (b) said first valve means operably connected to said first reservoir means, said first valve means adapted to be opened when said thrust plates are inserted in said sleeves, said first valve means permitting said lubricating fluid to enter second reservoir means formed by the retraction of said resilient means when said thrust plates are inserted in said sleeves; and
    (c) second valve means operably connected to said second reservoir means, said second valve means adapted to permit said lubricating fluid to flow from said second reservoir through said second valve means toward said sleeve and hubs when said thrust plates are retracted from said sleeves.

2. The gear-type spindle coupling of claim 1 wherein said first reservoir means includes biasing means for urging said lubricating fluid toward the roll and pinion ends of said shaft.

3. The gear-type spindle coupling of claim 2 wherein the biasing means of the first reservoir means includes a rear wall in operable engagement with spring means.

* * * * *